US012789587B2

(12) United States Patent
Behnert et al.

(10) Patent No.: US 12,789,587 B2
(45) Date of Patent: Nov. 10, 2026

(54) THERMAL MANAGEMENT MODULE

(71) Applicant: MAHLE INTERNATIONAL GMBH, Stuttgart (DE)

(72) Inventors: Dominik Behnert, Stuttgart (DE); Hannes Stadler, Stuttgart (DE); Holger Ulrich, Stuttgart (DE); Witalie Graf, Stuttgart (DE)

(73) Assignee: MAHLE International GmbH, Stuttgart (DE)

( * ) Notice: Subject to any disclaimer, the term of this patent is extended or adjusted under 35 U.S.C. 154(b) by 190 days.

(21) Appl. No.: 18/428,375

(22) Filed: Jan. 31, 2024

(65) Prior Publication Data

US 2024/0262164 A1 Aug. 8, 2024

(30) Foreign Application Priority Data

Feb. 6, 2023 (DE) ......................... 102023200937.4

(51) Int. Cl.
*B60H 1/00* (2006.01)
*B60H 1/32* (2006.01)

(52) U.S. Cl.
CPC ..... *B60H 1/00899* (2013.01); *B60H 1/00385* (2013.01); *B60H 1/00485* (2013.01); *B60H 1/00571* (2013.01); *B60H 1/3229* (2013.01); *B60H 1/00278* (2013.01); *B60H 2001/00942* (2013.01)

(58) Field of Classification Search
CPC ............ B60H 1/00899; B60H 1/00385; B60H 1/00485; B60H 1/00571; B60H 1/3229; B60H 1/00278; B60H 2001/00942; B60H 1/00507; B60H 1/00392; B60L 58/26; B60L 2240/545
See application file for complete search history.

(56) References Cited

U.S. PATENT DOCUMENTS

| | | | | | |
|---|---|---|---|---|---|
| 2,138,159 | A * | 11/1938 | Hanks | G01F 15/10 | 411/366.1 |
| 2,882,071 | A * | 4/1959 | Klompar | F16L 23/06 | 24/271 |
| 3,455,582 | A * | 7/1969 | Von Hoevel | F16L 23/10 | 285/302 |
| 3,508,633 | A * | 4/1970 | Nishimura | B60R 19/34 | 293/133 |

(Continued)

FOREIGN PATENT DOCUMENTS

| | | |
|---|---|---|
| CN | 108068581 | 5/2018 |
| CN | 108081910 | 5/2018 |

(Continued)

*Primary Examiner* — Ljiljana V. Ciric
(74) *Attorney, Agent, or Firm* — Barnes & Thornburg

(57) ABSTRACT

A thermal management model including
a first module part,
a second module part,
a mount that has a first mount part and second mount part,
the first module part is attached to the first mount part, and the second module part is attached to the second mount part,
the two module parts are connected to one another for fluid exchange by connecting lines,
the mount is designed such that it breaks apart between the first mount part and second mount part when subjected to the effects of a predefined force.

10 Claims, 3 Drawing Sheets

(56) References Cited

Figure 1:
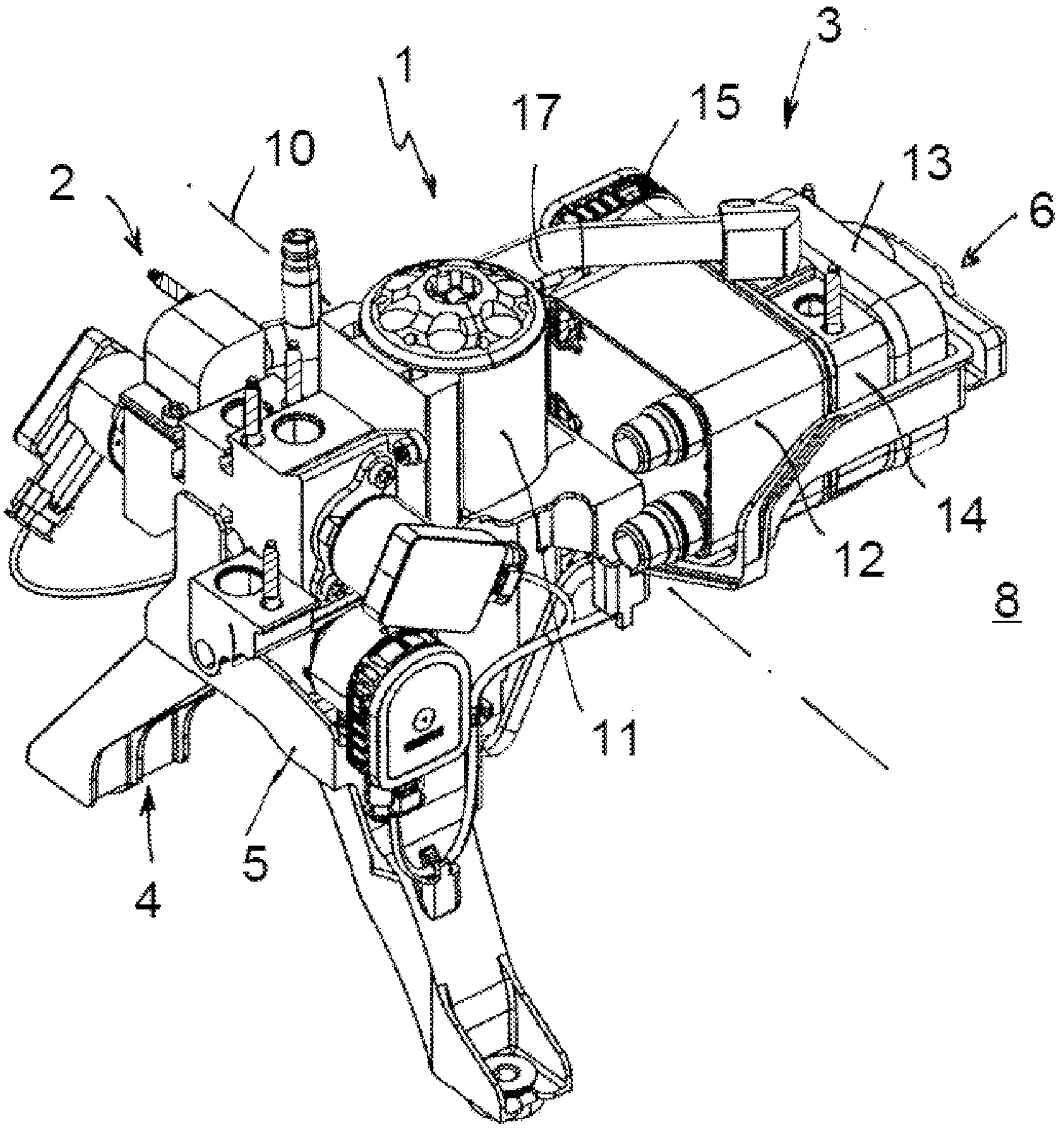

U.S. PATENT DOCUMENTS 3,811,337 A * 5/1974 Allison .................. B62D 1/197 74/492
3,858,987 A * 1/1975 Kleinhans ............... F16D 1/033 403/336
4,469,354 A * 9/1984 Caldwell ................. F16L 35/00 285/2
4,719,967 A * 1/1988 Scarselletta ............. F28F 9/001 228/183
5,000,487 A * 3/1991 Maiville ................. F16L 23/08 285/2
5,004,045 A * 4/1991 Le Gauyer .............. F28F 9/001 165/149
5,186,239 A * 2/1993 Young .................... B60K 11/04 165/149
5,224,574 A * 7/1993 Thum .................... B62D 21/15 188/371
5,257,454 A * 11/1993 Young ................. F28D 1/05366 29/890.03
5,404,940 A * 4/1995 van den Nieuwenhuizen ............ F28D 1/05366 165/149
5,931,223 A * 8/1999 Yu ........................... F28F 9/001 165/149
5,954,123 A * 9/1999 Richardson ............. F28F 9/001 165/149
6,129,142 A * 10/2000 Beldam ................... F28F 9/002 165/149
6,328,098 B1 * 12/2001 Kodumudi ............. F28F 9/001 165/149
6,412,547 B1 * 7/2002 Siler ....................... F28F 9/001 228/183
6,736,193 B2 * 5/2004 Kodumudi .............. F28F 9/001 165/149
7,143,512 B2 * 12/2006 Kroetsch ............. F28D 1/05366 29/418
7,198,095 B2 * 4/2007 Nguyen .................. F28F 9/001 165/149
7,389,810 B2 * 6/2008 Harada ................... F28F 9/001 165/149
7,621,317 B2 * 11/2009 Rousseau ................ F28F 9/001 165/149
7,699,095 B2 * 4/2010 Beamer ............... F28D 1/05366 165/172
7,721,791 B2 * 5/2010 Hayasaka ................ F01P 11/08 165/149
7,921,902 B2 * 4/2011 Horoho ................... F28F 9/001 165/149
8,136,579 B2 * 3/2012 Riondet .................. F28F 9/001 165/149
9,551,274 B2 * 1/2017 Eilemann ............ F02B 29/0412
10,260,822 B2 * 4/2019 Larsson .................. F28F 9/002
10,359,238 B2 * 7/2019 Johnson .................. F28F 3/025
10,393,451 B2 * 8/2019 Tylutki .................... F28F 9/001
10,914,536 B2 * 2/2021 Heine ................. F02B 29/0462
2002/0023734 A1 * 2/2002 Wagner ................. F28F 9/0226 165/173
2004/0251002 A1 * 12/2004 Reichle ................... F28F 9/001 165/149
2008/0047689 A1 * 2/2008 Hirose .................... F28F 9/001 165/149
2009/0047891 A1 2/2009 Dieksander et al.
2010/0089342 A1 4/2010 Wegner et al.
2023/0141829 A1 5/2023 Busch et al.
2023/0204298 A1 6/2023 Hu et al.
2024/0190203 A1 * 6/2024 Kang ................. B60H 1/00342
2024/0262164 A1 * 8/2024 Behnert ............. B60H 1/00385

FOREIGN PATENT DOCUMENTS

| | | | | | |
|---|---|---|---|---|---|
| CN | 108081910 | B | * | 6/2023 | ......... B60H 1/00028 |
| DE | 4309356 | A1 | * | 9/1994 | ......... B60H 1/00514 |
| DE | 102004039442 | | | 2/2006 | |
| DE | 102007010123 | | | 9/2008 | |
| DE | 102015108597 | A1 | * | 12/2016 | .............. F04B 53/08 |
| DE | 102020109006 | | | 10/2021 | |
| DE | 102020109006 | A1 | * | 10/2021 | ........... B60H 1/3229 |
| DE | 202022101077 | U1 | | 3/2022 | |
| EP | 962342 | A2 | * | 8/1999 | |
| JP | S63176715 | A | * | 7/1988 | |
| JP | 10058951 | A | * | 3/1989 | |
| JP | 3065584 | B2 | * | 7/2000 | ......... B60H 1/00564 |
| JP | 3700275 | B2 | * | 9/2005 | |
| JP | 2024508567 | A | * | 2/2024 | ........... B60H 1/3229 |
| WO | 2022/022371 | | | 2/2022 | |

* cited by examiner

THERMAL MANAGEMENT MODULE

CROSS-REFERENCE TO RELATED APPLICATIONS

This application claims priority from German Patent Application No. 102023200937.4, filed Feb. 6, 2023, the entirety of which is hereby fully incorporated by reference herein.

The present invention relates to a thermal management module. The invention also relates to a motor vehicle, in particular an electric vehicle, which has such a thermal management module.

Thermal management modules are used in modern temperature control units such as air conditioning systems and cooling units, in particular in electric vehicles, to control the temperature of a vehicle interior or a vehicle battery. These thermal management modules normally comprise numerous components, e.g. heat exchangers, refrigerant containers, etc. and are attached to a motor vehicle body, e.g. for an electric vehicle, with a mount.

To improve the collision behavior of a motor vehicle, current motor vehicles have different collision levels, which result in different deformations, depending on the forces acting on them. The disadvantage with the thermal management modules from the prior art is that they are in the form of a unified block, and can have an adverse effect on the collision behavior of the motor vehicle when a collision level is exceeded because they are displaced as a block.

The present invention therefore addresses the problem of creating an improved, or at least alternative, design for a thermal management module, which is distinguished in particular by an improved collision behavior.

The present invention is based on the general idea of equipping a thermal management module with a separating plane that breaks in a collision, with which is it is possible to integrate the thermal management module in a vehicle such that it breaks apart at the separating plane in the event of a collision, and the two module parts do not have a combined negative impact on the collision behavior, as has been the case so far with a thermal management module that remains intact and is displaced as a whole in a collision. The thermal management module according to the invention comprises a first module part and a second module part, as well as a mount comprising a first mount part and a second mount part. The first module part of the thermal management module is attached to the first mount part and the second module part is attached to the second mount part. They can be attached with screws, for example. The two module parts are connected to one another for fluid exchange by fluid lines. The mount is designed according to the invention such that it acts on the thermal management module when subjected to the effects of a predefined force, as in the case of a collision for example, such that it breaks apart between the first mount part and second mount part, and the two module parts are only still connected to one another by the flexible fluid lines, but no longer by the mount. This has the significant advantage that in comparison to previous thermal management modules, which are displaced as a whole in a motor vehicle, in particular an electric vehicle, they can now be separated in a defined manner at the collision plane or separating plane, which can have a very positive effect on the overall collision behavior. In modern automotive engineering, the motor vehicles are equipped with so-called crash boxes and crash systems, which become deformed in a predefined manner to absorb energy in a collision. A thermal management module that remains intact because it does not have a separating plane or collision plane, is displaced as a whole in a collision, which can have a negative impact in some cases on the deformation and therefore on the collision behavior. This negative impact may be because it was not possible to anticipate the collision behavior of prior thermal management modules, which could result in an unanticipated impact of the thermal management module with other components. With the mount according to the invention, which breaks apart between the first mount part and second mount part when subjected to the effects of a predefined force, e.g. in a collision, it is possible to create a thermal management module that breaks apart in a predefined manner during a collision, without having a combined negative impact because of the remaining flexible connection of the two module parts of the thermal management module in a collision by the connecting lines.

In an advantageous embodiment of the thermal management module according to the invention, the mount has a breaking point between the first mount part and the second mount part. This breaking point can be obtained with a cross section weakening, or cross section tapering, or, purely theoretically, another material could also be used at the breaking point. This breaking point can be created easily, and allows the mount, and therefore the thermal management module, to break apart in a predefined manner during a collision.

In another advantageous embodiment of the thermal management module according to the invention, the connecting lines form a sealed and flexible connection between the first module part and second module part when the mount breaks apart. These connecting lines can be formed by flexible hoses, for example, which maintain a fluid-tight connection between the two module parts of the thermal management module in a collision, and prevent contamination of the environment and a combined impact of the module parts. Purely theoretically, it is also possible to use tubes that are soft or have predefined bending points where they can bend in a predefined manner in a collision, i.e. if the mount breaks apart.

In a particularly preferred embodiment of the thermal management module according to the invention, the first module part has a refrigerant receiver and/or a first heat exchanger. The second module part can have a second and third heat exchanger, with a flange between them in which fluid channels are located that connect the second heat exchanger to the third heat exchanger for fluid exchange, and a first receiver for a valve assembly. There can also be a second flange on the second heat exchanger or third heat exchanger, which has a second receiver for a second valve assembly. It is therefore possible to place at least one valve assembly on both the first flange and second flange in the second module part, such that the first flange, between the two heat exchangers does not have to be excessively wide. This also reduces the necessary installation space. The different components of the thermal management module can be spatially separated as a result of the design of the first module part and second module part described above, such that a fluid connection of the two module parts through the separating plane, or collision plane, is only obtained through the connecting lines.

The present invention is also based on the general idea of equipping a motor vehicle, in particular an electric vehicle, with the thermal management module described above, and by this means, significantly improve the collision behavior of the motor vehicle. This is because the thermal management module can also break apart at a collision plane because it breaks apart at the crash plane or separating plane in a collision, and can therefore become deformed in a controlled manner.

In an advantageous embodiment of the motor vehicle according to the invention, the mount is attached to the motor vehicle body with its first mount part and/or its second mount part. This means that the entire thermal management module can be attached to the motor vehicle body with just its first mount part, such that the second module part of the thermal management module, connected to the second mount part, can move freely in a collision. It is also conceivable for the mount to be attached to the motor vehicle body with both its first mount part and second mount part, in which case it can be attached to different parts of the body. This can ensure that the first mount part, and therefore the first module part of the thermal management module, can become deformed with a first body part, and the second mount part, with the second module part, can be deformed with a second body part.

Other important features and advantages of the invention can be derived from the dependent claims, the drawings, and the description in reference to the drawings.

It should be clear that the features specified above and described below can be used not only in the combinations given therein, but also in other combinations or in and of themselves, without abandoning the scope of the present invention. Components of a higher level unit specified above and in the following, e.g. a device, apparatus or assembly, that are indicated separately, can form separate parts or components of this unit or be integral parts or sections thereof, even if they are not shown as such in the drawings.

Preferred exemplary embodiments of the invention are shown in the drawings and shall be explained in greater detail below, in which the same reference symbols are used for the same, similar, or functionally similar components.

Figure 2:
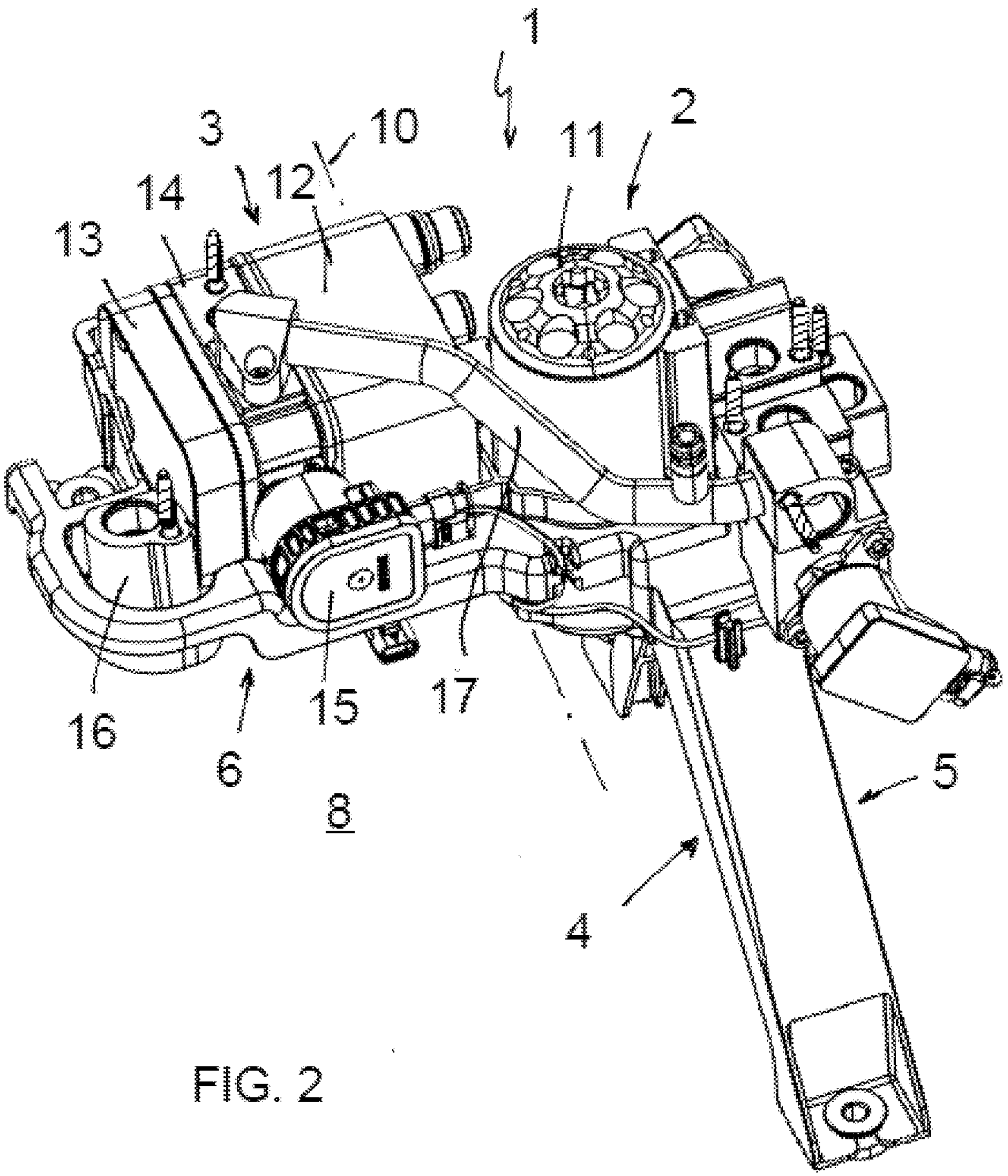
Figure 3:
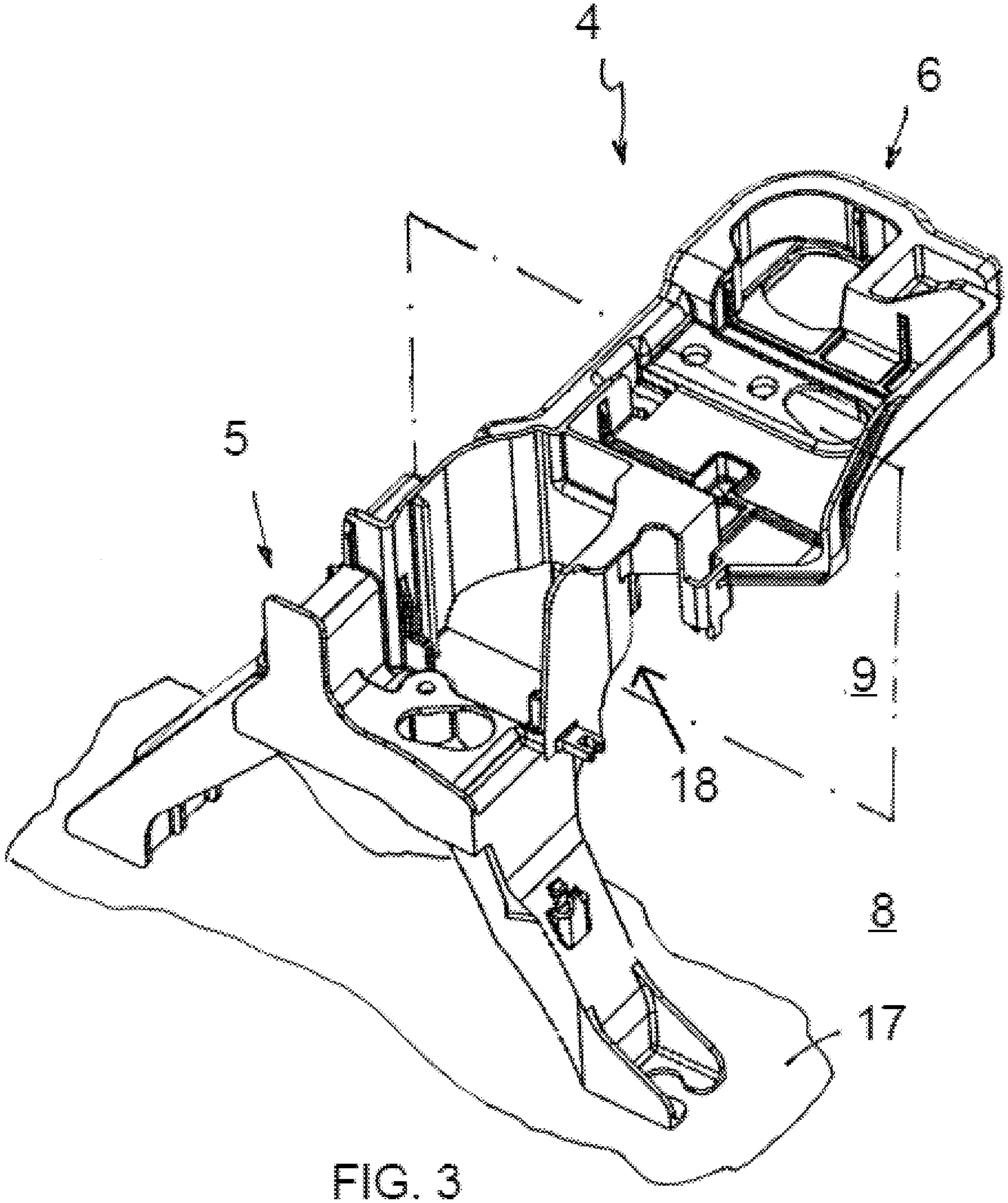

Therein, schematically:

FIG. 1: shows an illustration of a thermal management module according to the invention;

FIG. 2: shows an illustration like that in FIG. 1, but from another perspective; and FIG. 3: shows an illustration of a mount according to the invention for the thermal management module according to the invention.

As shown in FIGS. 1 and 2, a thermal management module 1 according to the invention has a first module part 2 and a second module part 3, and a mount 4 (see FIG. 3). The mount 4 has a first mount part 5 and a second mount part 6 connected thereto, with the first module part 2 connected to the first mount part 5, and the second module part 3 connected to the second mount part 6. The mount 4 can be made of metal, for example, in particular aluminum, or it can be made of plastic. The first module part 2 can be screwed, connected in a form-fitting manner, snapped, or clamped to the first mount part 5. The second module part 3 can also be secured in a similar manner to the second mount part 6. The two module parts 2, 3 of the thermal management module 1 are connected to one another for fluid exchange by fluid lines.

The thermal management module 1 is used in a motor vehicle, e.g. an electric vehicle, and results in a controlled breaking in a collision, having a positive effect on the overall collision behavior. This is because the mount 4 is designed to act on the thermal management module when subjected to the effects of a predefined force such as that during a collision, in that it breaks apart between the first mount part 5 and second mount part 6. A possible break line 10 or breaking plane 9 is shown in FIGS. 1, 2 and 3.

This break line 10 or breaking plane 9 between the first mount part 5 and second mount part 6 can be obtained with a breaking point 18, in particular obtained with a cross section tapering or material weakening such as at breaking point 18.

The connecting lines 7, only one of which is visible in FIG. 2, with the rest being underneath the first module part 2 and the second module part 3, are designed to form a flexible, sealed connection between the first module part 2 and second module part 3 when the mount 4 breaks apart at the breaking plane 9, or along the break line 10. This reliably prevents refrigerant leakage in particular. These connecting lines 7 can be formed by hoses or flexible tubes, for example.

Purely theoretically, the connecting lines 7 can also be designed to break in a collision, i.e. when the first module part 2 moves in relation to the second module part 3, and thus enable independent movement thereof.

The first module part 2 can contain a refrigerant receiver 11 and/or a first heat exchanger, while the second module part 3 can contain a second heat exchanger 12 and a third heat exchanger 13, for example. There can be a first flange 14 between the second heat exchanger 12 and the third heat exchanger 13, in which cooling channels are located that connect the second heat exchanger 12 to the third heat exchanger 13 for fluid exchange, and which has a first receiver for a first valve assembly 15, e.g. an expansion valve. A second flange 16 that has a second receiver for a second valve assembly, not shown in detail, can be located on the second heat exchanger 12 or third heat exchanger 13, in this case the third heat exchanger 13. This second flange 16 makes it possible to reduce the width of the first flange 14 and therefore reduce the necessary installation space.

In general, the thermal management module 1 can be attached to the body 17 of a motor vehicle 8 with its mount 4, i.e. its first mount part 5 and/or second mount part 6. In FIG. 3, the mount 4, and therefore the entire thermal management module 1, is only attached to the body 17 of the motor vehicle 8 by the first mount part 5. This allows the second mount part 6 to move independently of the first mount part 5 and the body 17 of the motor vehicle 8 in a collision.

Purely theoretically, it is also conceivable for the mount to be attached to the body 17 of a motor vehicle 8 with its first mount part 5 and second mount part 6, in which case the first mount part 5 can be attached to a different part of the body than the second mount part 6.

On the whole, a significantly improved collision behavior can be obtained with the thermal management module 1 according to the invention, by means of which battery cooling or air conditioning in a vehicle interior can be controlled, because the thermal management module 1 is no longer displaced as a cohesive, unified block in a collision, but instead can become deformed in individual parts, when the two mount parts 5, 6 break apart.

The specification can be readily understood with reference to the following Numbered Paragraphs:

Numbered Paragraph 1. A thermal management module (1), comprising a first module part (2), a second module part (3), a mount (4) that has a first mount part (5) and second mount part (6), wherein the first module part (2) is attached to the first mount part (5), and the second module part is attached to the second mount part (6), wherein the two module parts (2, 3) are connected to one another for fluid exchange by connecting lines (7), wherein the mount (4) is designed such that it breaks apart between the first mount part (5) and second mount part (6) when subjected to the effects of a predefined force.

Numbered Paragraph 2. The thermal management module according to Numbered Paragraph 1, characterized in that the mount (4) has a breaking point between the first mount part (5) and second mount part (6).

Numbered Paragraph 3. The thermal management module according to Numbered Paragraph 1 or 2, characterized in that the connecting lines (7) are designed such that when the mount (4) breaks apart, there is a sealed and flexible connection between the first module part (2) and second module part (3).

Numbered Paragraph 4. The thermal management module according to any of the preceding Numbered Paragraphs, characterized in that the connecting lines (7) are formed by hoses.

Numbered Paragraph 5. The thermal management module according to any of the preceding Numbered Paragraphs, characterized in that the first module part (2) contains a refrigerant receiver (11) and/or a first heat exchanger.

Numbered Paragraph 6. The thermal management module according to any of the preceding Numbered Paragraphs, characterized in that the second module part (3) contains the following components, a second heat exchanger (12), a third heat exchanger (13), a first flange (14) between the second heat exchanger (12) and third heat exchanger (13), in which there are fluid channels for connecting the second heat exchanger (12) to the third heat exchanger (13) for fluid exchange, and a first receiver for a first valve assembly (15), and a second flange (16) on the second heat exchanger (12) or third heat exchanger (13), which has a second receiver for a second valve assembly.

Numbered Paragraph 7. The thermal management module according to any of the preceding Numbered Paragraphs, characterized in that the breaking point is formed by a cross section tapering.

Numbered Paragraph 8. A motor vehicle (8) that has a thermal management module (1) according to any of the Numbered Paragraphs 1 to 7.

Numbered Paragraph 9. The motor vehicle according to Numbered Paragraph 8, characterized in that the mount (4) is attached to the body (17) of the motor vehicle (8) with its first mount part (5) and/or its second mount part (6).

Numbered Paragraph 10. The motor vehicle according to Numbered Paragraph 8 or 9, characterized in that the motor vehicle (8) is an electric vehicle.

The invention claimed is:

1. A thermal management module, comprising a first module part, a second module part, a mount that comprises a first mount part and second mount part, wherein the first module part is attached to the first mount part, and the second module part is attached to the second mount part, wherein the two module parts are connected to one another by connecting lines configured to exchange fluid between the first mount part and the second mount part, wherein the mount has a breaking point such that the mount breaks apart between the first mount part and second mount part when subjected to the effects of a predefined force, and wherein the connecting lines are configured such that when the mount breaks apart, there is a sealed and flexible connection between the first module part and second module part via the connecting lines.

2. The thermal management module according to claim 1, wherein the breaking point is between the first mount part and second mount part.

3. The thermal management module according to claim 2, wherein the breaking point is formed by a cross sectional tapering.

4. The thermal management module according to claim 1, wherein the connecting lines are formed by hoses.

5. The thermal management module according to claim 1, wherein the first module part contains a refrigerant receiver and/or a first heat exchanger.

6. The thermal management module according to claim 1, wherein the second module part comprises, a second heat exchanger, a third heat exchanger, a first flange between the second heat exchanger and the third heat exchanger, and comprising fluid channels connecting the second heat exchanger to the third heat exchanger for fluid exchange, and further comprising a first receiver for a first valve assembly, and a second flange on one of the second heat exchanger or the third heat exchanger, wherein the second flange comprises a second receiver for a second valve assembly.

7. A motor vehicle that has a thermal management module according to claim 1.

8. The motor vehicle according to claim 7 wherein the mount is attached to the body of the motor vehicle with one or both of the first mount part of the mount or the second mount part of the mount.

9. The motor vehicle according to claim 7, wherein the motor vehicle is an electric vehicle.

10. The motor vehicle according to claim 8, wherein the motor vehicle is an electric vehicle.

* * * * *